though and

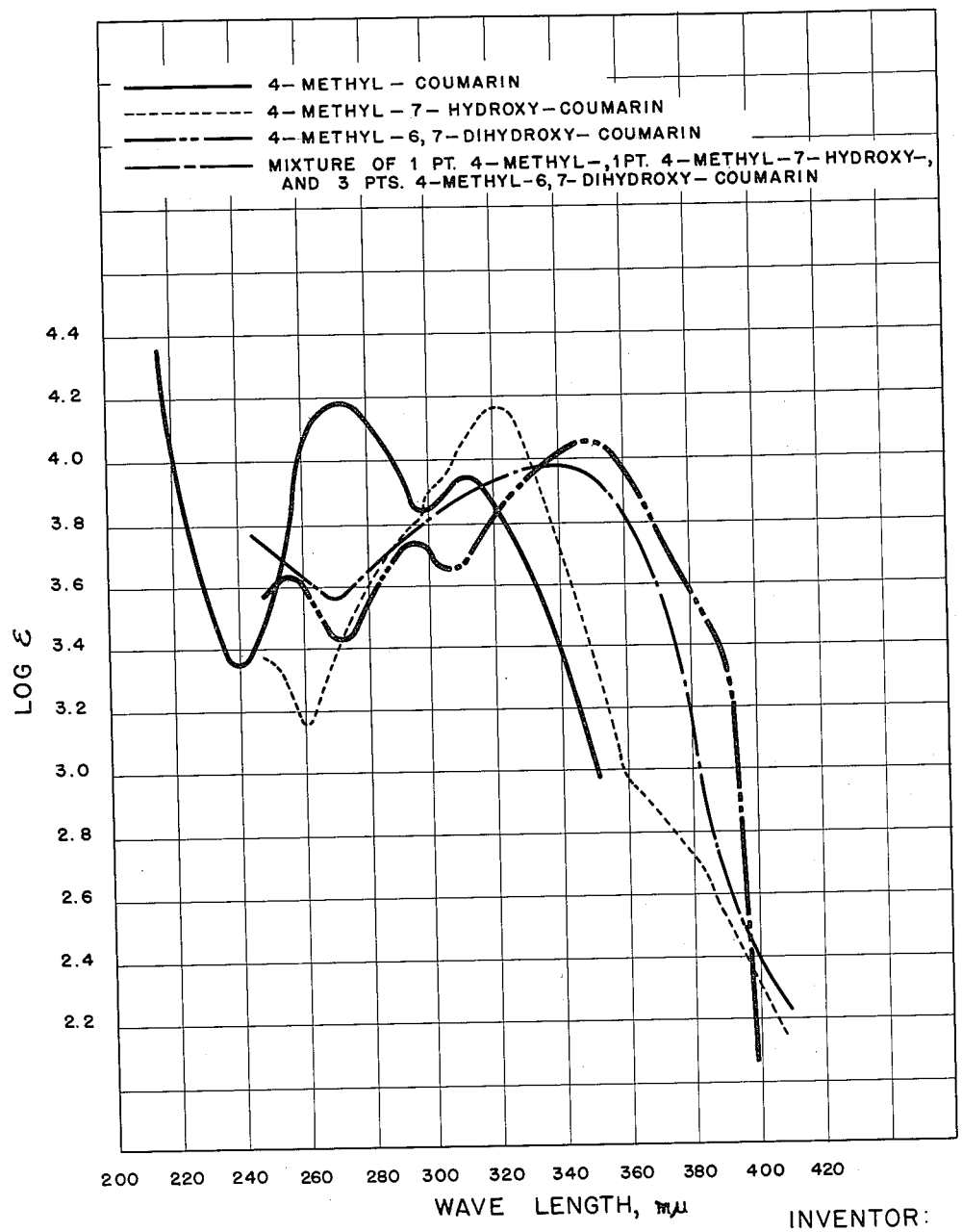

United States Patent Office 2,740,761
Patented Apr. 3, 1956

2,740,761

COMPOSITIONS FOR THE STABILIZATION OF SUBSTANCES AGAINST THE DETRIMENTAL ACTION OF ULTRA-VIOLET RADIATION

William K. T. Gleim, Orland Park, Ill., assignor to Universal Oil Products Company, Chicago, Ill., a corporation of Delaware Application October 11, 1952, Serial No. 314,340

11 Claims. (Cl. 252—300)

This application is a continuation-in-part of my copending application Serial No. 137,335, filed January 7, 1950, now abandoned.

This invention relates to novel compositions of matter and to the method of utilizing such compositions for reducing the harmful effects of ultra-violet radiations. More specifically, the invention concerns the utilization of certain derivatives of coumarin as absorbents of ultra-violet radiations within a certain range of wave lengths generally considered to be primary factors in deterioration of certain substances when exposed to sunlight.

It is well recognized that certain substances, particularly materials having an unstable or labile chemical structure, deteriorate upon exposure to sunlight which is composed of radiations of all wave lengths in the ultra-violet portion of the spectrum. It is recognized, for example, that certain dyes in wearing apparel and other fabrics are bleached or converted to an undesirable color modification when the fabric is exposed to sunlight for prolonged, and in some cases, even relatively short periods of exposure. It is a commonplace observation, too, that exposure of the human skin to direct sunlight for sufficient periods of time causes inflammation of the skin or "sunburn." Further, it is known that certain valuable food accessory factors, such as vitamin A and its precursors, the carotenes, are sensitive to ultra-violet light and are made at least partially ineffective insofar as their food accessory values are concerned upon exposure of the food to direct or even diffuse sunlight for extended periods of time. It has now been determined that ultra-violet radiations of only a certain limited range of wave lengths out of the total ultra-violet spectrum are responsible for many of the aforesaid undesirable effects of exposure to sunlight. For example, ultra-violet radiations of from 2800 to about 3500 Angstrom units of wave length cause inflammation of the human skin and the desirable "tanning" effect of sunlight is the result of the action of ultraviolet radiations of lower and higher wave lengths than those of from about 2800 to about 3500 Angstrom units. It is an object of this invention to supply a composition of matter which will absorb ultra-violet radiations of undesirable wave lengths when spread upon the exposed surface of admixed with a material sensitive to ultra-violet radiations or subject to deterioration when exposed thereto.

In one of its embodiments the present invention concerns a composition of matter which diminishes the transmission of ultra-violet light of wave lengths of from about 2,000 to about 4,000 Angstrom units through a film of the same, said composition consisting of a mixture of 4-methyl coumarin, 4-methyl-7-hydroxycoumarin, and 4-methyl-6,7-dihydroxycoumarin.

A more specific embodiment of this invention concerns a composition of matter which evenly diminishes the transmission of ultra-violet light of wave lengths of from about 2,000 to about 4,000 Angstrom units through a film on the same, said composition consisting of a mixture of one part of 4-methyl-7-hydroxy-coumarin, 1 part of 4-methyl-coumarin, and 3 parts of 4-methyl-6,7-di-hydroxycoumarin.

Another embodiment of the invention relates to a method of reducing the effect of ultra-violet light of wave lengths of from about 2,000 to about 4,000 Angstrom units on a particular light-sensitive subject to deterioration in the presence of ultra-violet radiations which comprises a suffusing said substance with a composition of matter consisting of a mixture of 4-methylcoumarin, 4-methyl-7-hydroxycoumarin, and 4 - methyl - 6,7 - dihydroxycoumarin.

Other objects and embodiments of the invention relating to specific aspects of the present composition of matter and to methods of applying the same will be referred to in greater detail in the following further description of the invention.

The individual 4-methylcoumarin derivatives utilized in the present composition as ultra-violet radiation screening agents absorb radiations having wave lengths throughout the range of from about 2,000 to about 4,000 Angstrom units and each exhibit maximum absorption at particular ranges of wave lengths within the above range. 4-methylcoumarin, for example, has a broad absorption band of from about 2,500 to about 3,200 Angstrom units and displays a maximum absorption of ultra-violet radiation having a wave length of approximately 2,700 Angstrom units. The logarithm of the molecular extinction coefficient, indicates that less than 1% of ultra-violet radiations of 2,700 Angstrom units wave length is transmitted through a film 0.3 mm. thick of the 4-methylcoumarin contained in a solution of approximately 0.1% concentration. Designated in another manner, the logarithm of the molar extinction co-efficient, that is, log $e$, for radiations of 2,700 Angstrom units wave length through a film of 4-methylcoumarin is equal to 4.19. 4-methyl-7-hydroxycoumarin absorbs ultra-violet radiations of relatively broad range of wave lengths, up about 3,500 Angstrom units and displays a maximum absorption or log $\epsilon=4.16$ when the radiations are of 3,220 Angstrom units in wave length. 4-methyl-6,7-di-hydroxycoumarin absorbs radiations over a still broader range of wave lengths, up to about 3900 Angstrom units and is particularly effective absorbent for ultra-violet radiations of from 3,200 to 4,000 Angstrom units in wave length. An ultra-violet absorption composition may, therefore, be provided which absorbs radiation of 2,700 Angstrom units most efficiently and radiations of shorter or longer wave lengths somewhat less efficiently by coating the surface exposed to the ultra-violet radiations with 4-methylcoumarin. Likewise, a mixture consisting of 4-methylcoumarin and 4-methyl-7-hydroxycoumarin absorbs ultraviolet radiations of from about 2,700 Angstrom units most efficiently (99%), while a mixture consisting of 4-methylcoumarin, 4-methyl-7-hydroxycoumarin, and 4-methyl-6,7-di-hydroxycoumarin absorbs a large proportion of ultraviolet radiations over the entire range of from about 2,000 to about 4,000 Angstrom units. Thus, although 4-methylcoumarin absorbs ultra-violet radiations in the lower portion of the range from 2,000 to 4,000 Angstrom units most effectively, preferred compositions which will be effective for screening ultra-violet radiations over the broader range of wave lengths must contain an appreciable quantity of the 4-methyl-7-hydroxycoumarin and the 4-methyl-6,7-dihydroxycoumarin components, the latter components reducing the transmittance of ultra-violet radiation of higher wave lengths in the upper portion of the range from 2,000 to 4,000 Angstrom units, generally considered to be the more harmful wave length radiations. The results of a series of tests to determine the transmittance of ultraviolet radiations of various compositions containing varying amounts of the individual 4-methylcoumarin and 7-hydroxy and 6,7 - dihydroxy derivatives of 4 - methyl-coumarin indicate that compositions to be effective ultra-violet screening agents over the entire range of from about 2,000 to about 4,000 Angstrom units, and particularly of those radiations in the range of wave lengths from about 3,500 to about 3,800 Angstrom units, must contain at least 25% and preferably at least 30% by weight of the mixture of 4-methyl-6,7-dihydroxycoumarin, at least 5% by weight of the mixture of components of 4-methylcoumarin, and at least 20% by weight of the mixture of 4-methyl-7-hydroxycoumarin. The proportion of 7-hydroxy and 6,7-dihydroxy derivatives of 4-methylcoumarin in the composition may be varied and the effective quantities of each in the composition are mutually dependent within the above minimum limitations; however, when the proportion of the 4-methyl-6,7-dihydroxycoumarin derivative in the composition is reduced to below 30% by weight of the mixture, the proportion of the 4-methyl-7-hydroxycoumarin component must be increased substantially in order for the resulting mixture to reduce the transmittance of ultra-violet radiations at least 99% (or 1% transmittance). Thus, an ultra-violet screening composition containing only 25% by weight of the 4-methyl-6,7-dihydroxycoumarin component in the mixture, must contain approximately 70% by weight of the 4-methyl-7-hydroxycoumarin component to be sufficiently effective to reduce 99% transmittance of radiations from 2,000 to 4,000 m. wave lengths. On the other hand, an increase of 5% by weight of the 4-methyl-6,7-dihydroxycoumarin component in the mixture, that is, to a total proportion of 30% by weight of the mixture, reduces the required amount of 4-methyl-7-hydroxycoumarin to about 40% by weight of the total mixture, the remaining 30% being the less costly 4-methyl-coumarin component. It is to be emphasized that the indicated proportions of the 4-methylcoumarin and its 7-hydroxy and 6,7-dihydroxy derivatives are intended to provide at least 99% absorption of ultra-violet radiations in the indicated range of wave lengths based on a composition containing 1% by weight of the indicated mixture of coumarin derivatives, an absorption standard considered as effective for the intended purposes of the ultra-violet screening composition. A particularly preferred mixture of said 4-methylcoumarin and the indicated derivatives thereof consists of approximately one part by weight each of 4-methyl-, and 4-methyl-7-hydroxycoumarin and three parts by weight of 4-methyl-6,7-di-hydroxycoumarin, said mixture absorbing ultra-violet radiations uniformly from about 2,000 to about 3,900 A., and particularly from about 2,500 to about 3,800. A mixture of coumarin derivatives containing the above quantities of each derivative provides an effective screen-agent of ultra-violet light radiations within the indicated range of wave lengths and when applied to the surface of a material sensitive to ultra-violet radiations, the composition excludes that portion of the ultra-violet spectrum considered to be detrimental.

In utilizing the above indicated coumarin derivatives as ultra-violet light screening agents in any particular application or usage thereof, the mixture of coumarin derivatives is desirably mixed with a convenient vehicle for application to the surface of the material to be protected from ultra-violet radiations or mixed with or impregnated in the material intended to be protected. One use of the present composition is the preservation of the carotene content of forage crops after cutting and during the curing stage to which the crop is normally subjected before feeding. In these curing operations, the crop, such as alfalfa, after mowing is allowed to lie exposed to the elements, including sunshine, for from several days to several weeks during the curing process. Test observations during the curing interval when the forage crop is exposed to the ultra-violet radiations present in sunlight, have shown that the cerotene normally present in relatively high quantities in alfalfa when freshly cut and which is ultimately converted to vitamin A during the digestion of the forage crop by the particular animal consuming the same, is rapidly destroyed as the curing operation begins and is ultimately reduced substantially to nil at the end of the period required for storage and curing. The valuable carotene content of such forage crops, however, may be preserved to a value representing substantially its original content in the forage crop at the time the same is cut by applying the present ultra-violet absorbing agent to the forage crop immediately prior to cutting or immediately following cutting and prior to the curing stage.

The present ultra-violet light screening agents consisting of a mixture of the various coumarin derivatives indicated above, may be sprayed on the forage crop in the form of a solution of the ultra-violet light screening agent in a suitable solvent, such as dilute ethanol. The composition may also be emulsified in water with the aid of a detergent or other surface active agent to promote emulsification or suspended in a non-polar suspending medium with the aid of non-ionic detergents and the resulting emulsion applied to the forage crop. The ultra-violet light screening agents are effective in very low concentrations within the suspending medium such that large fields of forage crops may be sprayed economically, as for example, with various machine-type sprayers or by spraying the composition on the forage crop from an airplane flying over the field. For large scale operation, as, for example, for the purpose of spraying forage crops, the aqueous or oil emulsion of the coumarin ultra-violet light screening agents may contain less than 1%, and often as little as 0.01% by weight of the indicated coumarin components.

Another typical use of the present ultra-violet light screening agent is its application as an absorbent of harmful ultra-violet radiations from sunlight for suntanning purposes. The mixture of coumarins for such use may be dissolved in alcohol or suspended in lanolin or Vaseline to provide a suitable ointment which may be applied to the surface of the skin for the prevention of sunburn. Suitable ointment or lotion compositions may contain the mixture of coumarin derivatives amounts of from about 0.1% to about 5% by weight of the ultimate ointment or lotion composition.

Fabrics may be protected from the bleaching action of sunlight by impregnating the fibres of the fabric with a solution or emulsion of the coumarin derivatives, or ultra-violet light screening agent composition herein provided and thereafter allowing the suspending agent or solvent of the coumarin to evaporate, depositing a residue of the coumarin derivatives in the innermost portions of the fibre and in contact with the dye subject to the bleaching action of the sunlight.

Another method to protect fabrics and also to protect foods or other substances whose flavor, color, or other qualities are labile upon exposure of the same to ultra-violet radiations, transluscent or transparent containers in which the light-sensitive material is contained, may have their surface coated with a thin layer of the mixture of coumarins, or the mixture of coumarin derivatives may be incorporated into the material from which the containers are manufactured by impregnating the container with a solution or emulsion of the coumarin derivatives. When the container is fabricated from waxed paper, as, for example, for the preparation of bags for potato chips which are peculiarly subject to rancidification by virtue of the action of ultra-violet light upon the fat contained in the potato chips in the presence of atmospheric oxygen, the wax utilized for impregnating the paper may contain the present coumarin derivatives prior to the impregnation treatment and thus deposit the ultra-violet screening agent in the fibrous structure of the bag, thereby preventing the entry of ultra-violet radiations into the bag in contact with the light-sensitive contents thereof.

In any of the above mentioned methods of applying the present ultra-violet light screening agents, or in any other method of applying the same, the material to be protected from the action of ultra-violet light radiations is applied to the surface of the object or the fibrous structure of the material is impregnated with the screening agent. Many additional and varied uses of the present mixture of coumarin derivatives as light screening agents are readily apparent to those skilled in the art and such uses may be devised as the need for light protecting agents arises.

The present composition comprising a mixture of the indicated coumarin derivatives may also contain other components which enhance the ultra-violet light screening effect of the indicated coumarins or achieve an incidental effect consistent with the particular application of the present composition. Thus, the composition may contain incorporated therewith a substance having the capacity of deactivating the catalytic effect of metallic impurities, such as iron, copper, nickel, etc., salts or oxides which normally would enhance the oxidation or rancidification of food products or other materials in contact therewith. Other substances, for example, which may be incorporated with the present coumarin ultra-violet light screening agents are specific organic compounds which act as oxidation inhibitors and which likewise have the effect of reducing the tendency of food products or other materials to undergo oxidation or rancidification. Any suitable metal deactivator and oxidation inhibitor mutually soluble with the coumarin component may be employed in admixture with the coumarins in the preparation of a desirable food package coating material. Such metal deactivators as salicylaldoxime, o-hydroxy acetophenone oxime, salicylal-butylamine, salicylalethanolamine, 1,2-di-(salicylalalamino)-propane, etc. are widely used as metal deactivators and may be employed in the presence of the ultra-violet light screening agents provided herein in amounts generally from about 0.1 to about 2% by weight of the resultant composition. Oxidation inhibitors particularly useful in coating food packaging materials are selected from a group of compounds characterized as 2-tert-alkyl-4-alkoxyphenols, one of the preferred inhibitors of this group comprising 2-tert-butyl-4-methoxyphenol. Suitable compositions containing an oxidation inhibitor, a light screening agent comprising the present mixture of coumarin derivatives and a carrying medium for the above components may contain, for example, from about 0.1 to about 5% by weight of the mixed coumarin derivatives, from about 0.1 to about 2.0% of the oxidation inhibitor, such as 2-tert-butyl-4-methoxyphenol, and the remainder, a suitable carrier or solvent of the above components such as an animal vegetable or petroleum wax. For the purposes of coating packaging materials other than for food containers, various other inhibitors, which may be toxic or non-toxic, may be utilized in the coating composition. Compounds of the cresol, butylphenol, phenylenediamine, and aminophenol type, as well as nordihydroquaiaretic acid, propylgallate 2,4-dimethyl-6-tert. butylphenol, 2,6-ditert butyl-4-methylphenol, 2,2-dimethyl-6-tertbutyl-5-hydroxycoumarin, etc. may be utilized in the coating composition as oxidation inhibitors, especially when the packaging container is to be utilized for enclosing materials other than food and where the toxic properties of the inhibitor is not an important factor in the choice of a component for the particular application.

This invention is further described with reference to light screening properties of the specific coumarin derivatives employed in the present composition in the following examples.

EXAMPLE I

Known solutions of 4-methylcoumarin, 4-methyl-7-hydroxy-coumarin, 4-methyl-6,7-dihydroxy-coumarin and a known solution of a mixture of 1 part by weight of the 4-methyl-, 1 part by weight of the 4-methyl-7-hydroxy-, and 3 parts by weight of the 4-methyl-6,7-dihydroxycoumarin derivatives in 95% alcohol were prepared and placed in an ultra-violet absorption spectrophotometer to obtain the molar extinction coefficients for the respective samples. The resulting absorption spectra are reproduced in the accompanying diagram. The absorption spectrogram curves indicate that less than 1% transmission of ultra-violet light occurs at concentrations of from about 0.1% to 1.0% by weight of the light screening agent through a layer of 0.3 mm. in thickness.

Although the specific mixture of the present light screening coumarin derivatives operates efficiently to exclude ultra-violet radiations over the broad range indicated (from about 2500 to about 3900 A.), other mixtures may be compounded to absorb efficiently over a still broader range or to absorb within a more limited range of ultra-violet wave lengths, to serve the particular purposes desired.

EXAMPLE II

Known solutions of a series of ultra-violet screening compositions containing various proportions of 4-methylcoumarin, 4-methyl-7-hydroxycoumarin and 4-methyl-6,7-dihydroxycoumarin were tester in an ultra-violet absorption spectrophotometer to determine the absorbance value for each of the compositions. The following Table I presents the absorbances for each composition spread to a thickness of 0.3 mm., the latter thickness being considered the usual amount of composition which would be applied to the surface of an object or substance subject to ultra-violet radiations in ordinary usage.

Table I

[Absorbance, $A_{0.3\ mm.}^{10g/liter,}$ for ultra-violet radiations of mixtures of 4-methylcoumarin, 4-methyl-7-hydroxycoumarin and 4-methyl-6,7-dihydroxycoumarin.]

| Wave length of Ultra-Violet, mμ | $C_1$,* 5% $C_2$,* 5% $C_3$,* 90% | 20 40 40 | 20 60 20 | 20 20 60 | 40 20 40 | 60 20 20 | 40 40 20 | 5 70 25 | 35 35 30 |
|---|---|---|---|---|---|---|---|---|---|
| 380 | 5.04 | 2.58 | 1.66 | 3.52 | 2.40 | 1.30 | 1.48 | 2.02 | 2.02 |
| 350 | 16.42 | 9.54 | 7.14 | 11.94 | 8.38 | 4.78 | 5.98 | 8.60 | 7.44 |
| 320 | 9.22 | 8.34 | 7.48 | 9.18 | 10.06 | 10.90 | 8.16 | 6.40 | 9.90 |
| 290 | 8.76 | 10.44 | 10.86 | 10.02 | 11.28 | 12.54 | 11.70 | 10.14 | 11.28 |
| 270 | 5.50 | 9.42 | 9.54 | 9.30 | 11.22 | 19.18 | 14.34 | 5.90 | 13.08 |
| 250 | 6.76 | 6.34 | 3.70 | 6.96 | 7.86 | 8.76 | 7.24 | 4.76 | 7.16 |

*NOTE.—$C_1$ is 4-methylcoumarin; $C_2$ is 4-methyl-7-hydroxycoumarin; $C_3$ is 4-methyl-6,7-dihydroxy-coumarin.

It will be noted from the results presented in the above Table I that in order to have an absorbance of at least 2 (that is, less than 1% transmission of ultra-violet radiation through a film of the applied mixture, where absorbance is defined as the logarithm of the ratio of the intensity of light transmitted through a film of zero thickness to the intensity of light through a film of a given thickness, which is equal to the logarithm of 1/Transmittance or the logarithm of 100, equal to 2) the composition at 1% concentration of the mixture in an organic solvent must contain at least 25% by weight of 4-methyl-6,7-dihydroxycoumarin, at least 5% by weight of 4-methyl-coumarin and at least 20% by weight of 4-methyl-7-hydroxycoumarin. Suitable ratios of the quantities of coumarin derivatives in the ultra-violet screening composition are: from about 25% to about 75% by weight of 4-methyl-6,7-dihydroxycoumarin, from about 20 to about 70% by weight of 4-methyl-7-hydroxy-coumarin, and from 5% to about 55% by weight of 4-methylcoumarin, although the preferred ratios of each of the components is approximately equimolar proportions, or about 30.2 weight percent of 4-methyl-coumarin, 33.3% 4-methyl-7-hydroxycoumarin and about 36.5% by weight of 4-methyl-6,7-dihydroxycoumarin.

I claim as my invention:

1. An ultra-violet light screening composition comprising a mixture of at least 5% by weight of 4-methylcoumarin, at least 20% by weight of 4-methyl-7-hydroxycoumarin, and at least 25% by weight of 4-methyl-6,7-dihydroxycoumarin.

2. The composition of claim 1 further characterized in that said mixture contains from about 5 to about 55% by weight of 4-methylcoumarin, from about 20 to about 70% by weight of 4-methyl-7-hydroxycoumarin, and from about 25 to about 75% by weight of 4-methyl-6,7-dihydroxycoumarin.

3. The composition of claim 1 further characterized in that said composition contains about 1% by weight of said mixture.

4. The composition of claim 1 further characterized in that said composition comprises a mixture of equimolar proportions of 4-methylcoumarin, 4-methyl-7-hydroxycoumarin and 4-methyl-6,7-dihydroxycoumarin.

5. An ultra-violet light screening composition comprising a mixture of about one part by weight of 4-methylcoumarin, about one part by weight of 4-methyl-7-hydroxycoumarin, and about three parts by weight of 4-methyl-6,7-dihydroxycoumarin.

6. An ultra-violet light screening composition for wax paper containers comprising a mixture of about one part by weight of 4-methylcoumarin, about one part by weight of 4-methyl-7-hydroxycoumarin, and about three parts by weight of 4-methyl-6,7-dihydroxycoumarin and a wax dissolved in said mixture.

7. The composition of claim 6 further characterized in that said composition contains from about 0.01 to about 5 percent by weight of said mixture of compounds.

8. An ultra-violet light screening composition comprising a fat oxidation inhibitor and a mixture of at least 5% by weight of 4-methylcoumarin, at least 20% by weight of 4-methyl-7-hydroxycoumarin, at least 25% by weight of 4-methyl-6,7-dihydroxycoumarin.

9. The composition of claim 8 further characterized in that said oxidation inhibitor is a 2-tert-alkyl-4-alkoxyphenol.

10. An ultra-violet light screening composition comprising a metal deactivator and a mixture of at least 5% by weight of 4-methylcoumarin, at least 20% by weight of 4-methyl-7-hydroxycoumarin, at least 25% by weight of 4-methyl-6,7-dihydroxycoumarin.

11. An ultra-violet light screening composition comprising a metal deactivator, a fat oxidation inhibitor and a mixture of at least 5% by weight of 4-methylcoumarin, at least 20% by weight of 4-methyl-7-hydroxycoumarin, at least 25% by weight of 4-methyl-6,7-dihydroxycoumarin.

References Cited in the file of this patent

UNITED STATES PATENTS

| | | |
|---|---|---|
| 2,038,114 | Joseph | Apr. 21, 1936 |
| 2,279,468 | Lahousse | Apr. 14, 1942 |
| 2,528,769 | McCracken | Nov. 7, 1950 |

FOREIGN PATENTS

| | | |
|---|---|---|
| 464,732 | Great Britain | Apr. 23, 1937 |

OTHER REFERENCES

The Am. Perfumer & Essential Oil Review, Sept. 1950, pp. 197–201 incl.